United States Patent
Arimilli et al.

(10) Patent No.: US 8,332,552 B2
(45) Date of Patent: Dec. 11, 2012

(54) SUPPORTING MULTIPLE HIGH BANDWIDTH I/O CONTROLLERS ON A SINGLE CHIP

(75) Inventors: Ravi K. Arimilli, Austin, TX (US); Claude Basso, Raleigh, NC (US); Jean L. Calvignac, Raleigh, NC (US); Daniel M. Dreps, Georgetown, TX (US); Edward J. Seminaro, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 12/270,569

(22) Filed: Nov. 13, 2008

(65) Prior Publication Data

US 2010/0122011 A1    May 13, 2010

(51) Int. Cl.
  *G06F 3/00*    (2006.01)
  *G06F 13/12*   (2006.01)
  *G06F 13/00*   (2006.01)
  *G06F 13/42*   (2006.01)
  *G06F 15/76*   (2006.01)
  *G06F 9/44*    (2006.01)
  *H04L 12/28*   (2006.01)
  *H04L 12/50*   (2006.01)
  *H03K 19/173*  (2006.01)
  *H01L 25/00*   (2006.01)

(52) U.S. Cl. ............... 710/62; 710/8; 710/11; 710/14; 710/72; 710/104; 710/105; 710/316; 710/317; 370/255; 370/351; 370/357; 370/362; 712/33; 719/327; 326/38; 326/41

(58) Field of Classification Search .................. None
See application file for complete search history.

(56) References Cited

U.S. PATENT DOCUMENTS

| | | | |
|---|---|---|---|
| 4,635,140 A | 1/1987 | Uchimi | |
| 5,351,087 A | 9/1994 | Christopher et al. | |
| 5,781,799 A | 7/1998 | Leger et al. | |
| 5,790,839 A | 8/1998 | Luk et al. | |
| 6,038,400 A | 3/2000 | Bell et al. | |
| 6,065,077 A | 5/2000 | Fu | |
| 6,192,482 B1 | 2/2001 | Casper et al. | |

(Continued)

OTHER PUBLICATIONS

Hoke, J.M. et al., "Self-timed interface for S/390 I/O subsystem interconnection", IBM Journal of Research and Development, vol. 43, No. 5/6, 1999, 12 pages.

(Continued)

*Primary Examiner* — Chun-Kuan Lee
*Assistant Examiner* — Henry Yu
(74) *Attorney, Agent, or Firm* — Stephen R. Tkacs; Stephen J. Walder, Jr.; Diana R. Gerhardt

(57) ABSTRACT

An integrated processor design includes physical interface macros supporting heterogeneous electrical properties. The processor design comprises a plurality of processing cores and a plurality of physical interfaces to connect to a memory interface, a peripheral component interconnect express (PCI Express or PCIe) interface for input/output, an Ethernet interface for network communication, and/or a serial attached SCSI (SAS) interface for storage. Each physical interface may be programmatically connected to a selected interface controller, such as a memory controller, a PCI Express controller, or an Ethernet controller, for example. A plurality of such controllers may be connected to a switch within the processor design, with the switch also being connected to each physical interface macro. Thus, the physical interface macros may be programmatically connected to a subset of the plurality of controllers.

17 Claims, 5 Drawing Sheets

U.S. PATENT DOCUMENTS

| | | | |
|---|---|---|---|
| 6,275,975 B1 | 8/2001 | Lambrecht et al. | |
| 6,330,645 B1 | 12/2001 | Harriman | |
| 6,647,001 B1* | 11/2003 | Bhagavath et al. | 370/331 |
| 6,748,475 B1 | 6/2004 | Sorensen | |
| 6,768,742 B1 | 7/2004 | Godfrey | |
| 6,891,397 B1* | 5/2005 | Brebner | 326/41 |
| 6,894,530 B1* | 5/2005 | Davidson et al. | 326/38 |
| 6,910,092 B2* | 6/2005 | Calvignac et al. | 710/310 |
| 6,973,658 B2* | 12/2005 | Nguyen | 719/327 |
| 7,126,947 B2 | 10/2006 | Kalkunte et al. | |
| 7,200,832 B2* | 4/2007 | Butt et al. | 716/17 |
| 7,254,650 B2* | 8/2007 | Lin et al. | 710/11 |
| 7,318,112 B2 | 1/2008 | Park | |
| 7,401,162 B2 | 7/2008 | Baker et al. | |
| 7,412,588 B2* | 8/2008 | Georgiou et al. | 712/33 |
| 7,420,384 B1* | 9/2008 | Sabih et al. | 324/750.3 |
| 7,464,360 B2* | 12/2008 | Haji-Aghajani et al. | 716/102 |
| 7,535,254 B1* | 5/2009 | Case | 326/39 |
| 7,626,418 B1* | 12/2009 | Kolze et al. | 326/39 |
| 7,664,888 B2* | 2/2010 | Tran et al. | 710/11 |
| 7,710,903 B2* | 5/2010 | Finn et al. | 370/255 |
| 2003/0046625 A1 | 3/2003 | Menon et al. | |
| 2004/0049604 A1* | 3/2004 | Nation et al. | 710/1 |
| 2006/0234637 A1 | 10/2006 | Mellitz | |
| 2006/0242504 A1* | 10/2006 | Kadota | 714/725 |
| 2007/0058657 A1 | 3/2007 | Holt et al. | |
| 2007/0090401 A1* | 4/2007 | Baumann et al. | 257/203 |
| 2007/0176625 A1* | 8/2007 | Hayashi et al. | 324/771 |
| 2008/0282030 A1* | 11/2008 | Kalwitz et al. | 711/114 |
| 2009/0059713 A1* | 3/2009 | Ijitsu | 365/233.1 |
| 2009/0103675 A1 | 4/2009 | Moghaddam et al. | |
| 2009/0144045 A1* | 6/2009 | Kanade | 703/21 |
| 2010/0122011 A1 | 5/2010 | Arimilli et al. | |

OTHER PUBLICATIONS

Markovic, Damijan et al., "On micro-macro interface conditions for micro scale based FEM for inelastic behavior of heterogeneous materials", Computer Methods in Applied Mechanics and Engineering, vol. 193, Issues 48-51, Dec. 2004, pp. 5503-5523.

U.S. Appl. No. 12/270,576, 1 page.

Interview Summary mailed Apr. 27, 2011 for U.S. Appl. No. 12/270,576, 3 pages.

Notice of Allowance mailed Jun. 23, 2011 for U.S. Appl. No. 12/270,576, 9 pages.

Response to Final Office Action filed with the USPTO on Jun. 3, 2011 for U.S. Appl. No. 12/270,576, 22 pages.

Final Office Action mailed Mar. 3, 2011 for U.S. Appl. No. 12/270,576, 24 pages.

Response to Office Action filed with the USPTO on Dec. 17, 2010 for U.S. Appl. No. 12/270,576, 24 pages.

\* cited by examiner

SUPPORTING MULTIPLE HIGH BANDWIDTH I/O CONTROLLERS ON A SINGLE CHIP

This invention was made with United States Government support under Agreement No. HR0011-07-9-0002 awarded by DARPA. The Government has certain rights in the invention.

BACKGROUND

The present application relates generally to an improved data processing system and method. More specifically, the present application is directed to physical interface macros (PHYs) supporting heterogeneous electrical properties.

In the current world, a data center comprises layers of computers, switches, controllers, and devices. A data center is a department that houses the computer systems and related equipment, such as network switches, routers, and storage. FIG. 1 illustrates a typical data center in the current art. Computers 102-104 connect to a layer of switches, which includes Internet protocol (IP) switch 112, Fibre Channel (FC) switch 114, message passing interface (MPI) switch 116, and switch 118. Switches 112-118 allow computers 102-104 to talk over one or more networks, communicate with storage, and perform total systems management, which is the management of all the computers and devices in the data center.

In the depicted example, IP switch 112 connects computers 102-104 to a wide area network (WAN) and/or local area network (LAN). FC switch 114 connects computers 102-104 to storage controller 122 and storage controller 124, which allow computers 102-104 to read to or write from just a bunch of disks (JBOD) 132 and JBOD 134, respectively. A JBOD is a group of hard disks in a computer or storage enclosure that are not set up as any type of redundant array of independent disk (RAID) configuration. They are just a bunch of disks. The configuration of the disks is handled by storage controllers 122, 124. MPI switch 116 and/or switch 118 allow computers 102-104 to perform total systems management.

FIG. 2 is a block diagram illustrating a typical multiple processor data processing system. In the depicted example, data processing system 200 may be a computer system, such as computers 102-104 in FIG. 1. Data processing system 200 has a plurality of processors 202, 204 connected via a symmetric multiprocessing (SMP) bus 220. Memory controller (MC) 232 and input/output channel controller (IOCC) 234 also connect to SMP bus 220. In the example shown in FIG. 2, IOCC 234 connects to a plurality of expansion slots, such as peripheral component interconnect express (PCI Express or PCIe) slots 236. One or more I/O adapters (not shown) may connect to PCI Express slots 236.

Traditionally, a processor, such as processor 202, would comprise a single core that runs a single thread. Improvements to the core design drove technology to increase effectiveness of the processor. With all this progress, the amount of improvement that can be made to the single core design is approaching a plateau. The next step to improving processor performance was to introduce multiple core designs. Also, a next step was to introduce multi-threaded processor design where each core can execute two or more threads simultaneously. What has resulted is a processor that is capable of an enormous amount of computation per piece of silicon. A processor that was a single core running at 16 MHz has matured into a piece of silicon with eight cores each running at up to 4 GHz and executing multiple threads. All the infrastructure around the processors is not keeping up.

SUMMARY

In one illustrative embodiment, a method for supporting multiple high bandwidth input/output controllers on a single chip is provided. The method comprises selecting an input/output interface controller for each physical interface macro within a plurality of physical interface macros. Each of the plurality of physical interface macros supports heterogeneous electrical properties to provide the selected one of a plurality of input/output interface controllers. The method further comprises setting a mode selector for each physical interface macro to provide the selected input/output interface for the respective selected controller.

In another illustrative embodiment, a processor comprises a plurality of processing cores and a plurality of physical interface macros. Each of the plurality of physical interface macros supports heterogeneous electrical properties to provide one of a plurality of input/output interface controllers. Each of the plurality of physical interface macros comprises a mode selector that is set to provide an input/output interface for a respective input/output interface controller.

These and other features of the illustrative embodiments will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 3:
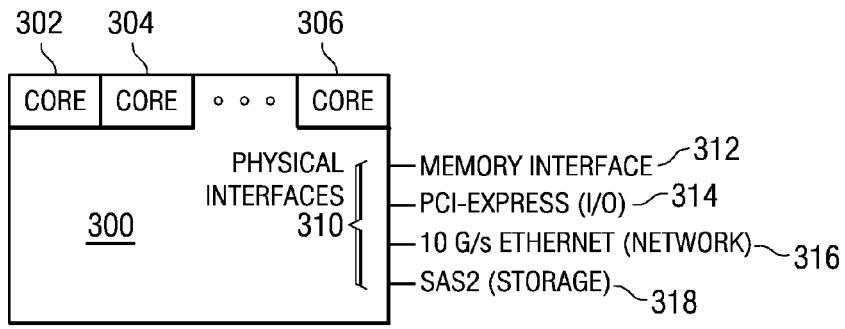
FIG. 3 depicts a pictorial representation of an exemplary processor in which aspects of the illustrative embodiments may be implemented.
Figure 4:
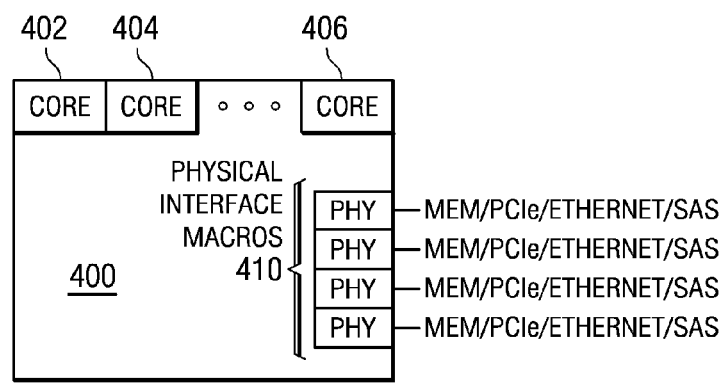
FIG. 4 depicts a pictorial representation of an exemplary processor with physical interface macros supporting heterogeneous electrical properties in accordance with an illustrative embodiment.

With reference now to the figures and in particular with reference to FIGS. 3 and 4, exemplary diagrams of data processing environments are provided in which illustrative embodiments of the present invention may be implemented. It should be appreciated that FIGS. 3 and 4 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 3 depicts a pictorial representation of an exemplary processor in which aspects of the illustrative embodiments may be implemented. Processor 300 comprises a plurality of processing cores 302, 304, 306. Processor 300 also has a plurality of integrated physical interfaces 310 that connect the processor to a memory interface 312, a peripheral component interconnect express (PCI Express or PCIe) interface 314 for input/output, an Ethernet interface 316 for network communication, and/or a serial attached SCSI 2 (SAS2) interface 318 for storage, for example.

Figure 1:
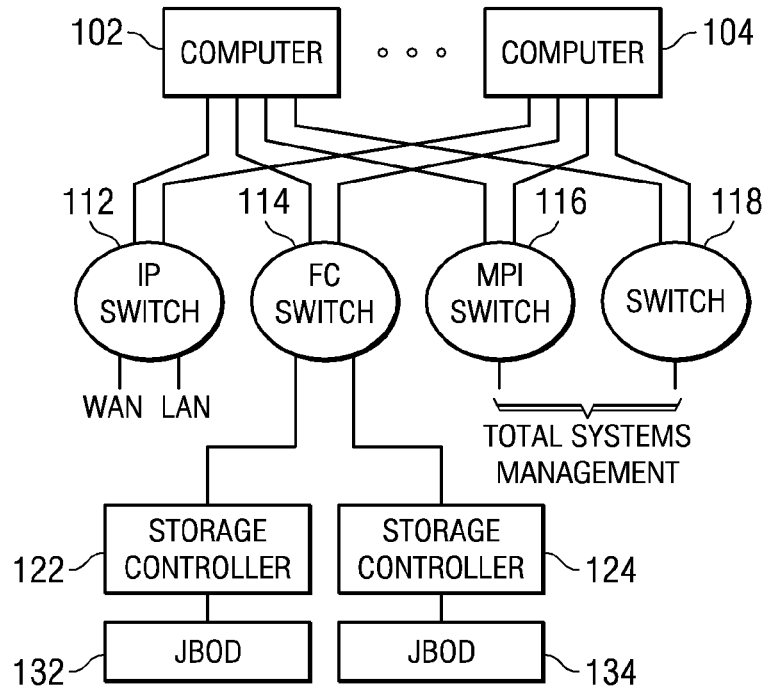
FIG. 1 illustrates a typical data center in the current art.
Figure 2:
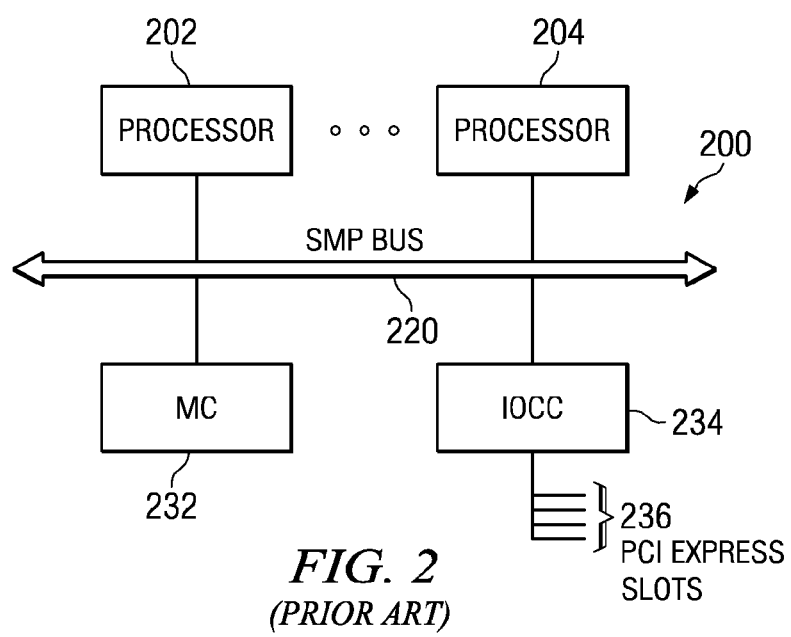
FIG. 2 is a block diagram illustrating a typical multiple processor data processing system.

Memory interface 312 may, for example, connect directly to synchronous dynamic random access memory (SDRAM) memory modules, such as double data rate (DDR) SDRAM modules. PCI Express interface 314 may connect to PCI Express adapters or a PCI Express fabric/switches. Ethernet interface 316 may be, for example, a 10 G/s Ethernet (10 Gig-E) interface, which may connect to an Internet protocol router or switch, such as IP switch 112 in FIG. 1, for instance. SAS interface 318 may attach directly to a storage controller, such as storage controller 122 in FIG. 1, for example, or to a storage network, such as FC switch 114 in FIG. 1, for example.

Those of ordinary skill in the art will appreciate that the hardware in FIG. 3 may vary depending on the implementation. Other internal hardware may be used in addition to or in place of the hardware depicted in FIG. 3. Also, processor 300 may include more or fewer cores or interfaces depending upon the implementation without departing from the spirit and scope of the present invention. For example, in a typical implementation, processor 300 may include a plurality of memory interfaces, two or more PCI Express interfaces, and so forth. Processor 300 may also include fewer such interfaces. For instance, processor 300 may include no SAS2 interface depending upon the implementation.

In one illustrative embodiment, the processor may include a plurality of physical interface macros that support heterogeneous electrical properties. This allows each physical interface to be programmatically connected to a selected interface controller, such as a memory controller, a PCI Express controller, or an Ethernet controller, for example. FIG. 4 depicts a pictorial representation of an exemplary processor with physical interface macros supporting heterogeneous electrical properties in accordance with an illustrative embodiment. Processor 400 comprises a plurality of processing cores 402, 404, 406. Processor 400 also has a plurality of integrated physical interface macros (PHYs) 410. Each physical interface macro 410 may behave as a selected interface controller, such as a memory controller, a PCI Express controller, an Ethernet controller, or a serial attached SCSI controller, for example.

Figure 5:
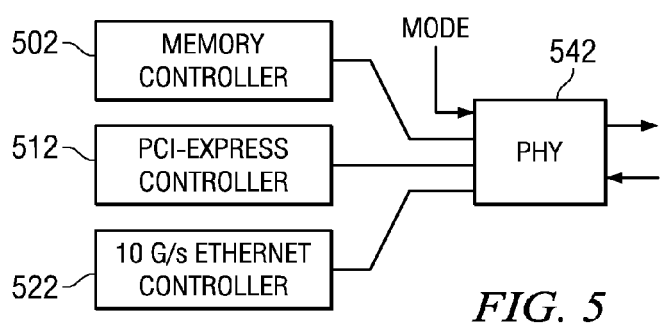
FIG. 5 is a block diagram illustrating an exemplary physical interface macro supporting heterogeneous electrical properties in accordance with one illustrative embodiment.

FIG. 5 is a block diagram illustrating an exemplary physical interface macro supporting heterogeneous electrical properties in accordance with one illustrative embodiment. Physical interface macro (PHY) 542 is connected to a memory controller 502, PCI-Express controller 512, and 10 G/s Ethernet controller 522. PHY 542 may be one of physical interface macros 410 in FIG. 4, for example. The mode selector instructs PHY 542 which of memory controller 502, PCI-Express controller 512, and 10 G/s Ethernet controller 522 is to be the actual interface of PHY 542. The design of PHY 542 allows it to behave as any one of the provided interfaces.

Returning to FIG. 4, physical interface macros (PHYs) 410 may be programmatically selected, using the mode selector, to behave as any combination of interface controllers. Thus, processor 400 may be specifically configured to provide any combination of I/O interfaces to suit the intended use of processor 400. Thus, the same processor design can be used for a customer that wants a processor with no Ethernet interface but seven memory interfaces or a customer that wants a processor with one memory interface and four Ethernet interfaces.

A result of this design is that processor 400 may include a large number of physical interfaces, more than the number of actual I/O interfaces coming off the chip. However, relative to the physical size of a core on the die, the physical interface controllers are very small. The real estate on the die for the physical interface controllers is insignificant relative to the size of the other components on the die. Furthermore, in one exemplary embodiment, one may gate off the physical interface controllers that are not selected so they do not consume any power.

Figure 6:
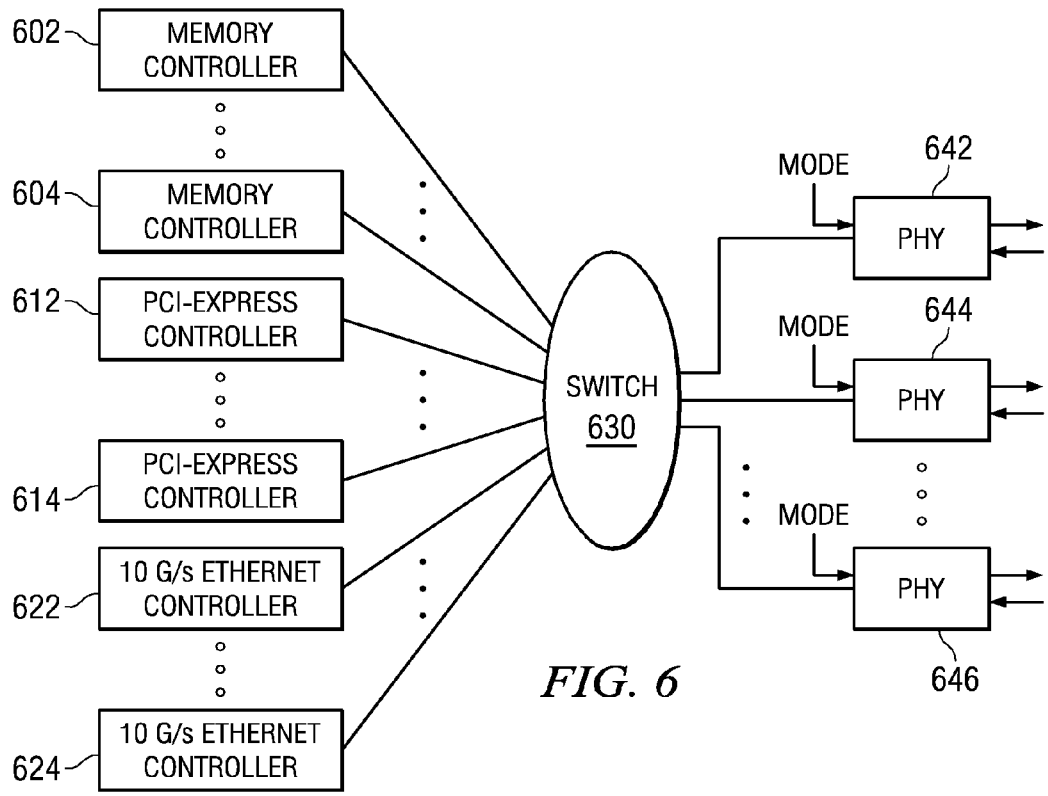
FIG. 6 is a block diagram illustrating an exemplary configuration of physical interface macros supporting heterogeneous electrical properties in accordance with an illustrative embodiment.

FIG. 6 is a block diagram illustrating an exemplary configuration of physical interface macros supporting heterogeneous electrical properties in accordance with an illustrative embodiment. PHYs 642-646 connect to switch 630. PHYs 642-646 may be physical interface macros 410 in FIG. 4, for example. A plurality of memory controllers 602-604, a plurality of PCI Express controllers 612-614, and a plurality of 10 G/s Ethernet controllers 622-624 also connect to switch 630. Each one of PHYs 642-646 includes a mode selector that allows one to select one of memory controllers 602-604, PCI Express controllers 612-614, or Ethernet controllers 622-624 for the respective PHY to support as the input/output interface of the chip. Thus, a smaller number of interface controllers may be provided on the processor, while still providing a high number of possible configurations.

Figure 7:
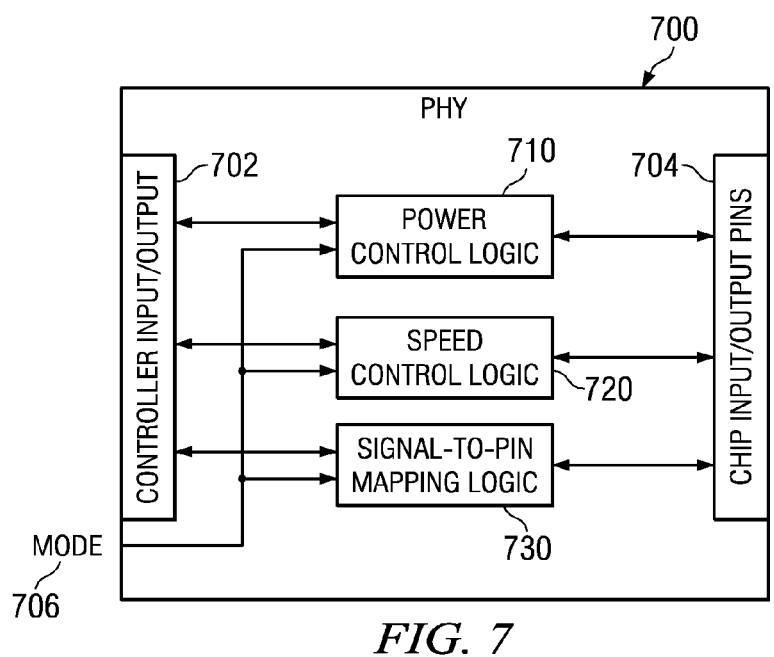
FIG. 7 is a block diagram illustrating a design of a physical interface macro supporting heterogeneous electrical properties in accordance with an illustrative embodiment.

FIG. 7 is a block diagram illustrating a design of a physical interface macro supporting heterogeneous electrical properties in accordance with an illustrative embodiment. Physical interface macro (PHY) 700 receives controller input/output signals 702 for a plurality of controllers. The controllers may include, for example, memory controllers, PCI Express controllers, Ethernet controllers, or Serial Attached SCSI controllers. PHY 700 provides selected signals to chip input/output pins 704, which are the external input/output pins for the processor chip.

Controller input/output signals 702 may have different power or speed requirements. PHY 700 includes power control logic 710 to control the power from controller input/output signals 702 to chip input/output pins 704. Power control logic 710 ensures that the signals coming from the processor logic and the selected controller are provided to chip input/output pins 704 within the expected and required power parameters. Power control logic 710 receives mode signal 706 and controls power output based on the selected controller for PHY 700.

PHY 700 also includes speed control logic 720 to control the speed at which controller input/output signals 702 are provided to chip input/output pins 704. Speed control logic 720 ensures that the signals coming from the processor logic and the selected controller are provided to chip input/output pins 704 within the expected and required speed parameters. Speed control logic 720 receives mode signal 706 and controls the speed of the input and output based on the selected controller for PHY 700.

PHY 700 also includes signal-to-pin mapping logic 730, which receives mode signal 706 and maps controller input/output signals 702 to the chip input/output pins 704. Different controller types have different input/output pin configurations. For example, a parallel interface, such as for a memory controller, would have a different pin configuration than a serial interface, such as for a SAS controller. Signal-to-pin mapping logic 730 maps the signals 702 to the input/output pins 704 based on the selected controller for PHY 700.

Figure 8A:
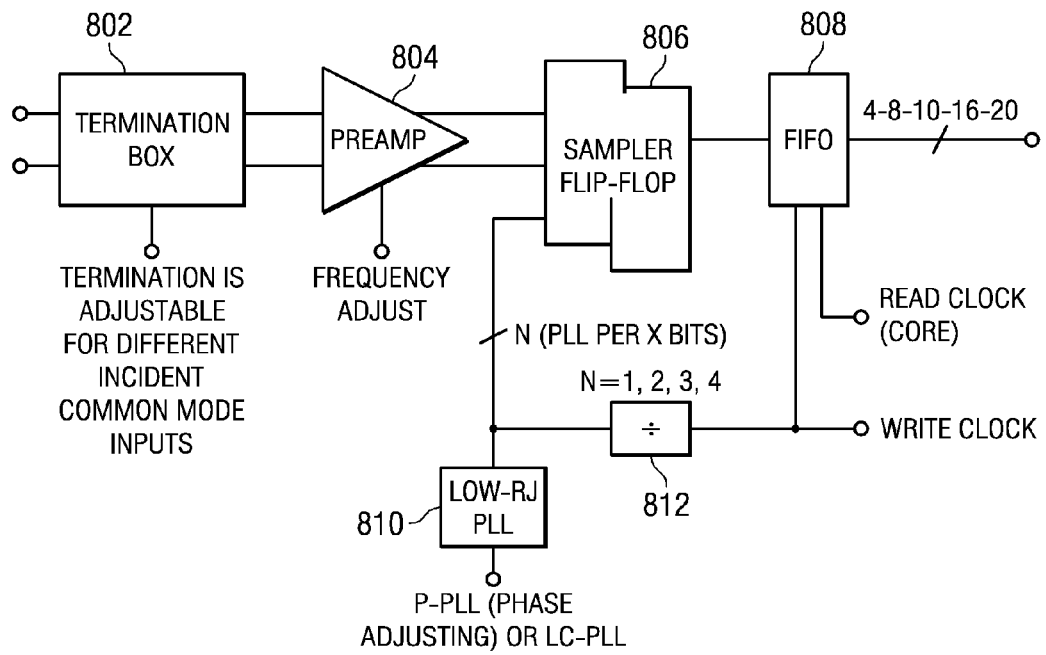
FIG. 8A is a diagram illustrating an example of a universal receiver physical interface macro in accordance with an illustrative embodiment.

FIG. 8A is a diagram illustrating an example of a universal receiver physical interface macro in accordance with an illustrative embodiment. Termination box 802 receives a differential signal from the chip input/output pins. Termination box 802 is configured to be adjustable for different incident common mode inputs. Termination box 802 provides the received signal to preamplifier (preamp) 804. A preamp is an electronic amplifier that precedes another amplifier to prepare an electronic signal for further amplification or processing. Preamp 804 is configured to be frequency adjustable.

Preamp 804 provides output to sampler flip-flop 806. A flip-flop is an electronic circuit (a bistable multivibrator) that has two stable states and thereby is capable of serving as one bit of memory. A flip-flop is usually controlled by one or two control signals and/or a gate or clock signal. In the depicted example, sampler flip-flop 806 receives a clock signal from low random jitter phase lock loop (PLL) 810. A phase lock loop (PLL) is a control system that generates a signal that has a fixed relation to the phase of a reference signal. A PLL circuit responds to both the frequency and the phase of the input signals, automatically raising or lowering the frequency of a controlled oscillator until it is matched to the reference in both frequency and phase. PLL 810 may be a phase adjusting or an inductive oscillator type PLL.

Sampler flip-flop 806 provides output to first-in-first-out (FIFO) buffer 808, which provides output on four, eight, ten, sixteen, or twenty output lines to the controller input/output. Divider 812 divides the clock signal from PLL 810 by a factor of one, two, three, or four. This divided clock is then provided to FIFO 808 and as a write clock to the controller input/output. FIFO 808 also provides a read clock to the controller input/output. In the depicted example, the read clock is the core clock.

Figure 8B:
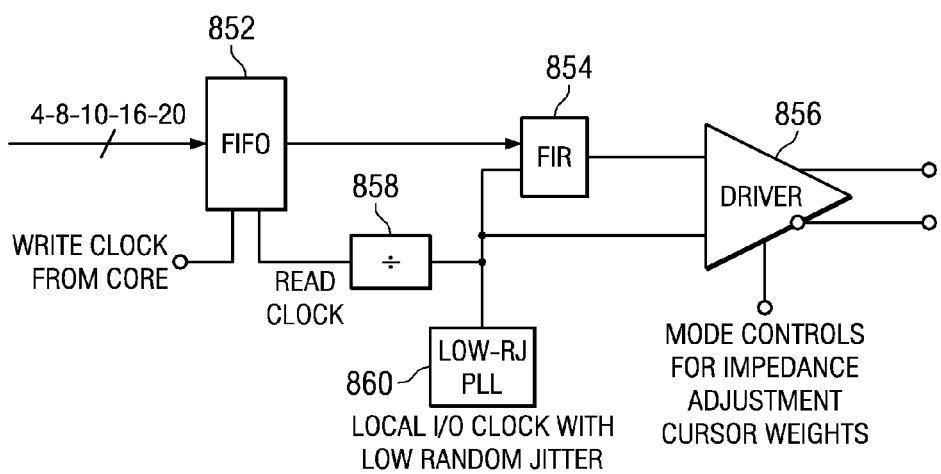
FIG. 8B is a diagram illustrating an example of a universal driver physical interface macro in accordance with an illustrative embodiment.

FIG. 8B is a diagram illustrating an example of a universal driver physical interface macro in accordance with an illustrative embodiment. First-in-first-out (FIFO) buffer 852 receives four, eight, ten, sixteen, or twenty input lines from the chip input/output pins. FIFO 852 receives a write clock from a processor core through controller input/output. FIFO 852 also receives a read clock from divider 858, which receives a clock signal from phase lock loop (PLL) 860. PLL 860 generates a local I/O clock with low random jitter.

PLL 860 also provides the clock signal to finite impulse response (FIR) filter 854. FIFO 852 provides output to FIR filter 854, which provides output to driver 856. PLL 860 also provides the clock signal to driver 856, which provides a differential output signal to the controller input/output. Driver 856 receives mode controls for impedance adjustment cursor weights. Driver 856 may be a series source terminated (SST) type of driver, for example.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 9:
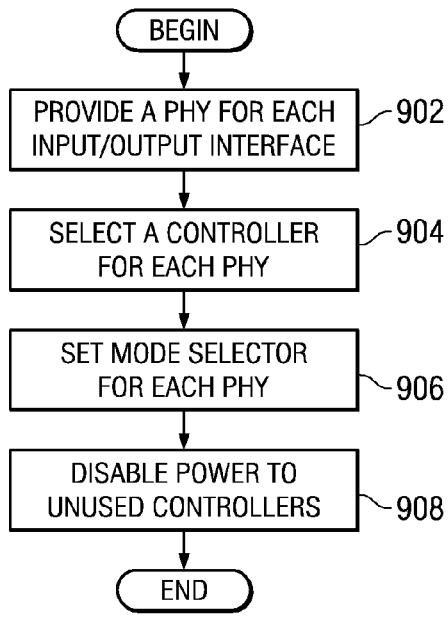
FIG. 9 is a flowchart illustrating operation of providing a processor with physical interface macros supporting heterogeneous electrical properties in accordance with an illustrative embodiment.

FIG. 9 is a flowchart illustrating operation of providing a processor with physical interface macros supporting heterogeneous electrical properties in accordance with an illustrative embodiment. Operation begins, and the processor designer provides a physical interface macro (PHY) for each physical input/output interface on the chip (block 902). The processor designer selects a controller, such as a memory controller, a PCI Express controller, or an Ethernet controller, for example, for each PHY, depending upon the implementation and intended use of the processor (block 904). The processor designer then sets a mode selector for each PHY (block 906). Then, the processor designer may disable power to unused controllers on the die (block 908). The designer may disable power, for example, by burning a fuse that disconnects the controller from the voltage rail(s). Thereafter, operation ends.

Figure 10:
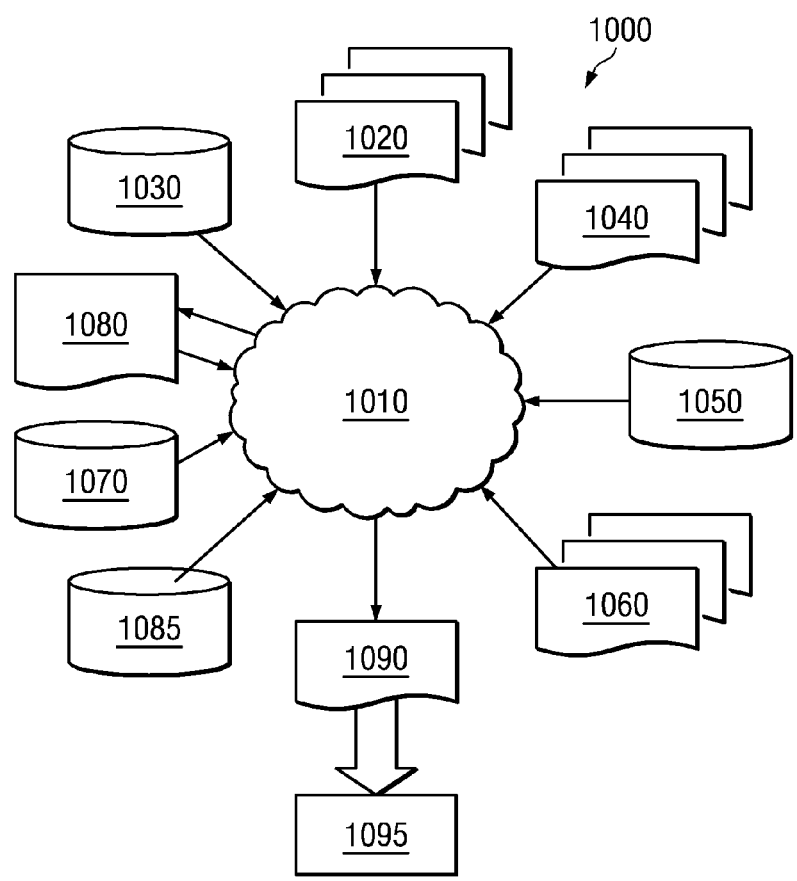
FIG. 10 is a flow diagram of a design process used in semiconductor design, manufacture, and/or test.

FIG. 10 shows a block diagram of an exemplary design flow 1000 used for example, in semiconductor design, manufacturing, and/or test. Design flow 1000 may vary depending on the type of IC being designed. For example, a design flow 1000 for building an application specific IC (ASIC) may differ from a design flow 1000 for designing a standard component. Design structure 1020 is preferably an input to a design process 1010 and may come from an IP provider, a core developer, or other design company or may be generated by the operator of the design flow, or from other sources. Design structure 1020 comprises an embodiment of the invention as shown in FIGS. 3-7, 8A, and 8B in the form of schematics or HDL, a hardware-description language (e.g., Verilog, VHDL, C, etc.). Design structure 1020 may be contained on one or more machine readable medium. For example, design structure 1020 may be a text file or a graphical representation of an embodiment of the invention as shown in FIGS. 3-7, 8A, and 8B. Design process 1010 preferably synthesizes (or translates) an embodiment of the invention as shown in FIGS. 3-7, 8A, and 8B into a netlist 1080, where netlist 1080 is, for example, a list of wires, transistors, logic gates, control circuits, I/O, models, etc. that describes the connections to other elements and circuits in an integrated circuit design and recorded on at least one of machine readable medium. This may be an iterative process in which netlist 1080 is resynthesized one or more times depending on design specifications and parameters for the circuit.

Design process 1010 may include using a variety of inputs; for example, inputs from library elements 1030 which may house a set of commonly used elements, circuits, and devices, including models, layouts, and symbolic representations, for a given manufacturing technology (e.g., different technology nodes, 32 nm, 45 nm, 90 nm, etc.), design specifications 1040, characterization data 1050, verification data 1060, design rules 1070, and test data files 1085 (which may include test patterns and other testing information). Design process 1010 may further include, for example, standard circuit design processes such as timing analysis, verification, design rule checking, place and route operations, etc. One of ordinary skill in the art of integrated circuit design can appreciate the extent of possible electronic design automation tools and applications used in design process 1010 without deviating from the scope and spirit of the invention. The design structure of the invention is not limited to any specific design flow.

Design process 1010 preferably translates an embodiment of the invention as shown in FIGS. 3-7, 8A, and 8B, along with any additional integrated circuit design or data (if applicable), into a second design structure 1090. Design structure 1090 resides on a storage medium in a data format used for the exchange of layout data of integrated circuits (e.g. information stored in a GDSII (GDS2), GL1, OASIS, or any other suitable format for storing such design structures). Design structure 1090 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 3-7, 8A, and 8B. Design structure 1090 may then proceed to a stage 1095 where, for example, design structure 1090: proceeds to tape-out, is released to manufacturing, is released to a mask house, is sent to another design house, is sent back to the customer, etc.

Thus, the illustrative embodiments recognize the disadvantages of the prior art and provide an integrated processor design with physical interface macros supporting heterogeneous electrical properties. The processor design comprises a plurality of processing cores and a plurality of physical interfaces to connect to a memory interface, a peripheral component interconnect express (PCI Express or PCIe) interface for input/output, an Ethernet interface for network communication, and/or a serial attached SCSI (SAS) interface for storage.

In one illustrative embodiment, each physical interface may be a physical interface macro that supports heterogeneous electrical properties. This allows each physical interface to be programmatically connected to a selected interface controller, such as a memory controller, a PCI Express controller, or an Ethernet controller, for example. In another illustrative embodiment, a plurality of such controllers are connected to a switch within the processor design, and the switch is also connected to each physical interface macro. Thus, the physical interface macros may be programmatically connected to a subset of the plurality of controllers.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for configuring multiple high bandwidth input/output controllers for a plurality of processing cores on a processor chip, the method comprising:

connecting a plurality of physical interface macros and a plurality of input/output interface controllers to a switch on the processor chip, wherein the switch and the plurality of input/output interface controllers are implemented in hardware in the processor chip;

selecting an input/output interface controller, from the plurality of input/output interface controllers on the processor chip, for each physical interface macro within the plurality of physical interface macros on the processor chip, wherein each of the plurality of physical interface macros supports heterogeneous electrical properties to provide the selected one of a plurality of input/output interface controllers;

setting a mode selector for each physical interface macro to configure each physical interface macro to provide an input/output interface for the respective selected input/output interface controller;

disabling power permanently to non-selected input/output interface controllers, wherein the plurality of input/output interface controllers consist of the selected input/output interface controllers and the non-selected input/output interface controllers;

configuring the switch to connect each physical, interface macro to its respective selected input/output interface controller such that the plurality of physical interface macros and their respective input/output interface controllers provide a plurality of input/output interfaces for the plurality of processing cores on the processor chip.

2. The method of claim 1, wherein the plurality of input/output interface controllers comprise a plurality of memory controllers, a plurality of peripheral component interconnect express controllers, and a plurality of Ethernet controllers.

3. The method of claim 2, wherein the plurality of input/output interface controllers further comprise a plurality of serial attached SCSI controllers.

4. The method of claim 1, wherein a given physical interface macro within the plurality of physical interface macros comprises:

power control logic that is configured to ensure that signals coming from processor logic and the selected input/output interface controller are provided to chip input/output pins within expected and required power parameters for a selected input/output interface controller type;

speed control logic that is configured to ensure that signals coming from the processor logic and the selected input/output interface controller are provided to the chip input/output pins within expected and required speed parameters for the selected input/output interface controller type; and signal-to-pin mapping logic that is configured to map signals coming from the processor logic and the selected input/output interface controller to the chip input/output pins.

5. A processor chip, comprising:

a plurality of processing cores;

a switch implemented in hardware within the processor chip;

a plurality of input/output interface controllers implemented in hardware within the processor chip; and a plurality of physical interface macros, wherein each of the plurality of physical interface macros supports heterogeneous electrical properties to provide one of the plurality of input/output interface controllers and wherein each of the plurality of physical interface macros comprises a mode selector that is set to configure each physical interface macro to provide an input/output interface for a respective selected input/output interface controller, wherein the switch is configured to connect each physical interface macro to its respective selected input/output interface controller such that the plurality of physical interface macros and their respective input/output interface controllers provide a plurality of input/output interfaces for the plurality of processing cores on the processor chip; and wherein power is permanently disabled to non-selected input/output interface controllers, wherein the plurality of input/output interface controllers consist of the selected input/output interface controllers and the non-selected input/output interface controllers.

6. The processor chip of claim 5, wherein the plurality of input/output interface controllers comprise a plurality of memory controllers, a plurality of peripheral component interconnect express controllers, and a plurality of Ethernet controllers.

7. The processor chip of claim 6, wherein the plurality of input/output interface controllers further comprise a plurality of serial attached SCSI controllers.

8. The processor chip of claim 5, further comprising
a plurality of fuses that are configured to disable the power to the non-selected input/output interface controllers within the plurality of input/output interface controllers.

9. The processor chip of claim 5, wherein a given physical interface macro within the plurality of physical interface macros comprises:
power control logic that is configured to ensure that signals coming from processor logic and a selected input/output interface controller are provided to chip input/output pins within expected and required power parameters for a selected input/output interface controller type;
speed control logic that is configured to ensure that signals coming from the processor logic and the selected input/output interface controller are provided to the chip input/output pins within expected and required speed parameters for the selected input/output interface controller type; and
signal-to-pin mapping logic that is configured to map signals coming from the processor logic and the selected input/output interface controller to the chip input/output pins.

10. A data processing system, comprising:
a processor; and
a memory coupled to the processor, wherein the memory comprises instructions which, when executed by the processor, cause the processor to:
select an input/output interface controller, from a plurality of input/output interface controllers on the processor chip, for each physical interface macro within a plurality of physical interface macros on the processor chip, wherein the processor chip comprises a plurality of processing cores, wherein each of the plurality of physical interface macros supports heterogeneous electrical properties to provide the selected one of a plurality of input/output interface controllers, wherein the plurality of physical interface macros and the plurality of input/output interface controllers connect to a switch on the processor chip, and wherein the switch and the plurality of input/output interface controllers are implemented in hardware in the processor chip;
set a mode selector for each physical interface macro to configure each physical interface macro to provide an input/output interface for the respective selected input/output interface controller;
disable power permanently to non-selected input/output interface controllers, wherein the plurality of input/output interface controllers consist of the selected input/output interface controllers and the non-selected input/output interface controllers; and
configure a switch on the processor chip to connect each physical interface macro to its respective selected input/output interface controller such that the plurality of physical interface macros and their respective input/output interface controllers provide a plurality of input/output interfaces for the plurality of processing cores on the processor chip.

11. The data processing system of claim 10, wherein the plurality of input/output interface controllers comprise a plurality of memory controllers, a plurality of peripheral component interconnect express controllers, and a plurality of Ethernet controllers.

12. The data processing system of claim 11, wherein the plurality of input/output interface controllers further comprise a plurality of serial attached SCSI controllers.

13. The data processing system of claim 10, wherein a given physical interface macro within the plurality of physical interface macros comprises:
power control logic that is configured to ensure that signals coming from processor logic and the selected input/output interface controller are provided to chip input/output pins within expected and required power parameters for a selected input/output interface controller type;
speed control logic that is configured to ensure that signals coming from the processor logic and the selected input/output interface controller are provided to the chip input/output pins within expected and required speed parameters for the selected input/output interface controller type; and
signal-to-pin mapping logic that is configured to map signals coming from the processor logic and the selected input/output interface controller to the chip input/output pins.

14. A computer program product comprising a computer readable storage medium having a computer readable program stored therein, wherein the computer readable program, when executed on a computing device, causes the computing device to:
select an input/output interface controller, from a plurality of input/output interface controllers on the processor chip, for each physical interface macro within a plurality of physical interface macros on the processor chip, wherein the processor chip comprises a plurality of processing cores, wherein each of the plurality of physical interface macros supports heterogeneous electrical properties to provide the selected one of a plurality of input/output interface controllers, wherein the plurality of physical interface macros and the plurality of input/output interface controllers connect to a switch on the processor chip, and wherein the switch and the plurality of input/output interface controllers are implemented in hardware in the processor chip;
set a mode selector for each physical interface macro to configure each physical interface macro to provide an input/output interface for the respective selected input/output interface controller;
disable power permanently to non-selected input/output interface controllers, wherein the plurality of input/output interface controllers consist of the selected input/output interface controllers and the non-selected input/output interface controllers; and
configure a switch on the processor chip to connect each physical interface macro to its respective selected input/output interface controller such that the plurality of physical interface macros and their respective input/output interface controllers provide a plurality of input/output interfaces for the plurality of processing cores on the processor chip.

15. The computer program product of claim 14, wherein the plurality of input/output interface controllers comprise a plurality of memory controllers, a plurality of peripheral component interconnect express controllers, and a plurality of Ethernet controllers.

16. The computer program product of claim 15, wherein the plurality of input/output interface controllers further comprise a plurality of serial attached SCSI controllers.

17. The computer program product of claim 14, wherein a given physical interface macro within the plurality of physical interface macros comprises:

power control logic that is configured to ensure that signals coming from processor logic and the selected input/output interface controller are provided to chip input/output pins within expected and required power parameters for a selected input/output interface controller type;

speed control logic that is configured to ensure that signals coming from the processor logic and the selected input/output interface controller are provided to the chip input/output pins within expected and required speed parameters for the selected input/output interface controller type; and signal-to-pin mapping logic that is configured to map signals coming from the processor logic and the selected input/output interface controller to the chip input/output pins.

\* \* \* \* \*